US009633127B2

(12) United States Patent
Baessler et al.

(10) Patent No.: US 9,633,127 B2
(45) Date of Patent: Apr. 25, 2017

(54) DEPLOYING PROGRAMS IN A CLUSTER NODE (71) Applicant: INTERNATIONAL BUSINESS MACHINES CORPORATION, Armonk, NY (US)

(72) Inventors: Michael Baessler, Neckartenzlingen (DE); Peng Hui Jiang, Beijing (CN); Pi Jun Jiang, Beijing (CN); Xi Ning Wang, Beijing (CN); Yan Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/560,347

(22) Filed: Dec. 4, 2014

(65) Prior Publication Data
US 2015/0188995 A1  Jul. 2, 2015

(30) Foreign Application Priority Data
Jan. 2, 2014 (CN) .......................... 2014 1 0001336

(51) Int. Cl.
G06F 17/30 (2006.01)
H04L 29/08 (2006.01)
G06F 9/54 (2006.01)

(52) U.S. Cl.
CPC ......... G06F 17/3089 (2013.01); G06F 9/542 (2013.01); H04L 67/26 (2013.01); H04L 67/32 (2013.01); H04L 67/34 (2013.01)

(58) Field of Classification Search
CPC ..................................................... H04L 67/10
See application file for complete search history.

(56) References Cited

U.S. PATENT DOCUMENTS

| 5,539,886 A | 7/1996 | Aldred et al. |
| 6,606,744 B1 | 8/2003 | Mikurak |
| 7,950,010 B2 | 5/2011 | Goger et al. |
| 8,527,980 B2 | 9/2013 | Stich et al. |
| 8,776,044 B1 * | 7/2014 | Vaidya .................... G06F 9/542 717/171 |

(Continued)

FOREIGN PATENT DOCUMENTS

WO    2007064849    6/2007

OTHER PUBLICATIONS

William R. Otte et al., "Towards an Adaptive Deployment and Configuration Framework for Component-based Distributed Systems," ISIS Publication, Proceedings of the 9th Workshop on Adaptive and Reflective Middleware (ARM '10), Bengaluru, India, 2010, pp. 1-6.

(Continued)

Primary Examiner — Jimmy H Tran
(74) Attorney, Agent, or Firm — Law Office of Jim Boice (57) ABSTRACT A dependency between a program to be deployed in a node in a cluster and other programs to be deployed in the cluster is obtained by one or more processors, which also obtain an IP address and connection information of a sub/pub server. A client computer connects to the sub/pub server, and subscribes to the sub/pub server for a message describing other programs on which the program is dependent. In response to obtaining the message of other programs on which the program is dependent from the sub/pub server, the program is deployed.

18 Claims, 6 Drawing Sheets (56) References Cited

U.S. PATENT DOCUMENTS

| | | | |
|---|---|---|---|
| 2003/0182392 A1* | 9/2003 | Kramer | G06F 17/3089 |
| | | | 709/217 |
| 2004/0046785 A1* | 3/2004 | Keller | G06F 9/5061 |
| | | | 715/734 |
| 2004/0049509 A1* | 3/2004 | Keller | G06F 11/008 |
| 2004/0255291 A1 | 12/2004 | Sierer et al. | |
| 2005/0172282 A1* | 8/2005 | Shenfield | G06F 9/547 |
| | | | 717/174 |
| 2005/0262503 A1 | 11/2005 | Kane | |
| 2005/0289539 A1 | 12/2005 | Krishna | |
| 2008/0141275 A1* | 6/2008 | Borgendale | G06F 9/541 |
| | | | 719/313 |
| 2009/0006559 A1* | 1/2009 | Bhogal | H04L 12/1818 |
| | | | 709/206 |
| 2010/0095297 A1* | 4/2010 | Sethi | G06F 8/63 |
| | | | 718/1 |
| 2012/0110372 A1* | 5/2012 | Borgendale | G06F 9/546 |
| | | | 714/4.11 |
| 2012/0331044 A1 | 12/2012 | Timmons | |
| 2013/0204948 A1 | 8/2013 | Zeyliger et al. | |

OTHER PUBLICATIONS

Ye Zhao et al "DYNATOPS: A Dynamic Topic-based Publish/Subscribe Architecture," ACM, DEBS'13, 2013, pp. 1-12.

* cited by examiner

DEPLOYING PROGRAMS IN A CLUSTER NODE

BACKGROUND

The present invention relates to deployment of programs, and more specifically, to a method and system for deploying programs in a cluster node.

Program deployment consists of processes of program installation, parameter configuration and initiation. In a distributed system, nodes having different programs installed thereon play different roles. Programs installed on different nodes might have a dependency and need to be installed, configured and initiated in a certain order. For example, before deploying program A in node X, program B needs to be deployed in node Y first. Since the deployment of different programs on different nodes is distributed or autonomous, the collaborative deployment of different programs on different nodes is quite difficult.

Currently a common solution is as below: while installing and upgrading programs in a cluster topological structure, in order to ensure great scalability, first multiple nodes accomplishing a same function are clustered such that various nodes have a predefined or random dependency among them, and then respective nodes are deployed manually according to the dependency. This method, however, is not only time-consuming but also error-prone.

SUMMARY

In an embodiment of the present invention, a method for deploying programs in a cluster node comprises: obtaining, by one or more processors, a dependency between a program to be deployed in a node in a cluster and other programs to be deployed in the cluster; obtaining, by one or more processors, an IP address and connection information of a sub/pub server; connecting, by one or more processors, a client computer to the sub/pub server; subscribing, by one or more processors, to the sub/pub server for a message of other programs on which the program is dependent; and deploying, by one or more processors, the program in response to obtaining the subscribed message of other programs on which the program is dependent from the sub/pub server.

In an embodiment of the present invention, a system for deploying programs in a cluster node comprises: a dependency obtaining hardware module configured to obtain a dependency between a program to be deployed in the node in the cluster and other programs to be deployed in the cluster; an IP address and connection information obtaining hardware module configured to obtain an IP address and connection information of a sub/pub server; a connecting hardware module configured to connect to the sub/pub server; a subscribing hardware module configured to subscribe to the sub/pub server for a message of other programs on which the program is dependent; and a deploying hardware module configured to deploy the program in response to obtaining the subscribed message of other programs from the sub/pub server.

In an embodiment of the present invention computer program product deploys programs in a cluster node, the computer program product comprising a computer readable storage medium having program code embodied therewith, wherein the computer readable storage medium is not a transitory signal per se, and wherein the program code is readable and executable by a processor to perform a method comprising: obtaining a dependency between a program to be deployed in a node in a cluster and other programs to be deployed in the cluster; obtaining an IP address and connection information of a sub/pub server; connecting a client computer to the sub/pub server; subscribing to the sub/pub server for a message of other programs on which the program is dependent; and deploying the program in response to obtaining the subscribed message of other programs on which the program is dependent from the sub/pub server.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
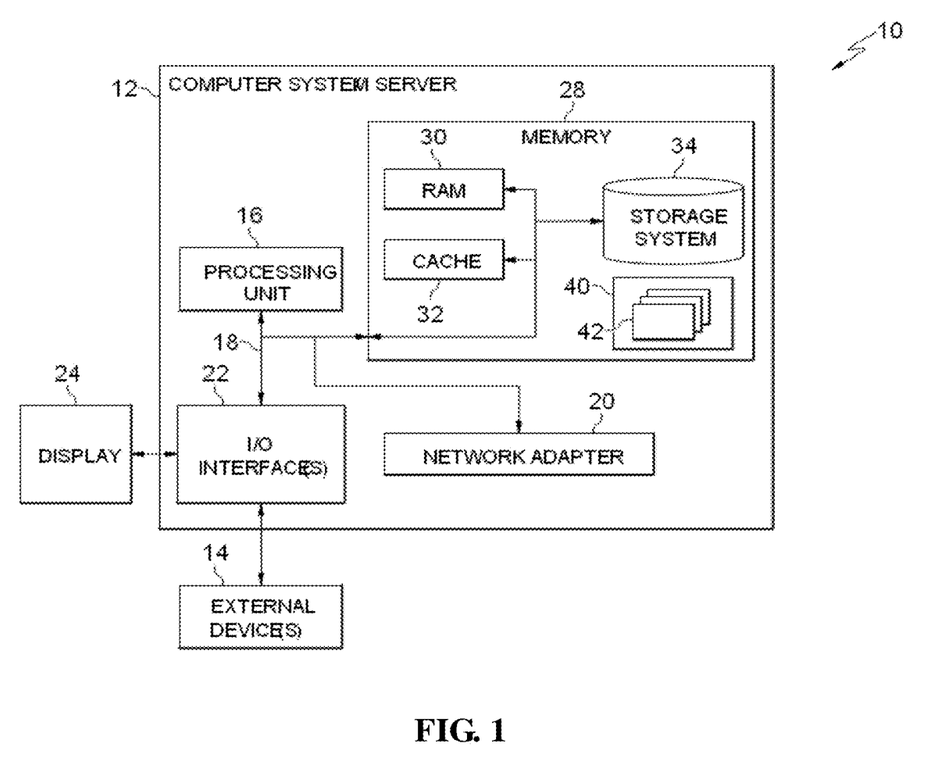
FIG. 1 shows a block diagram of an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
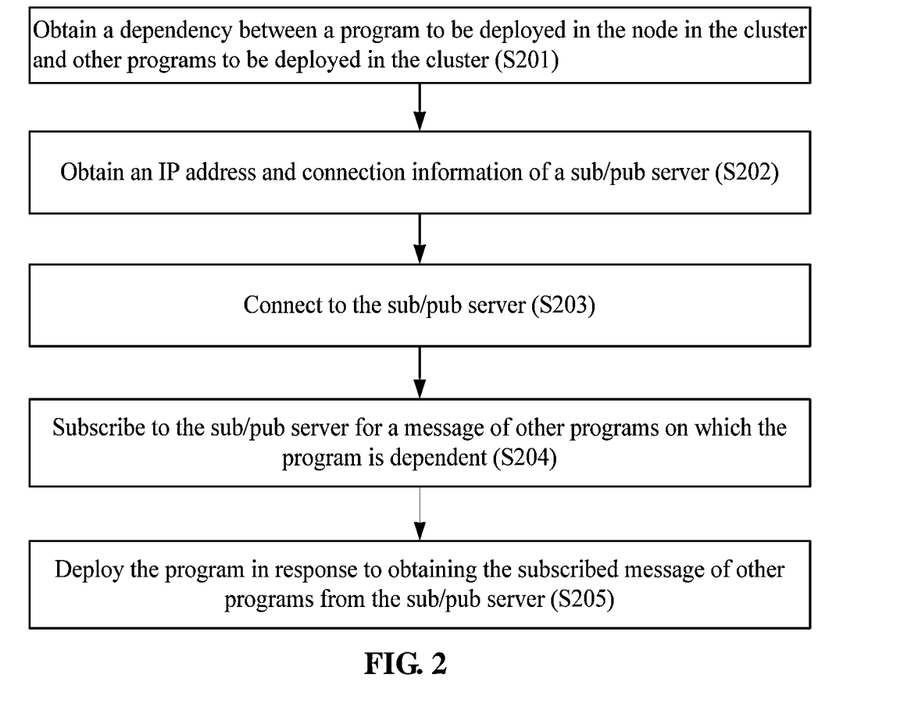
FIG. 2 schematically shows a flowchart of a method for deploying programs in a cluster node according to one embodiment of the present invention.

The present invention discloses a method and system for deploying programs in a cluster node. FIG. 2 schematically shows a flowchart of a method for deploying programs in a cluster node according to one embodiment of the present invention. According to FIG. 2, in step S201, a dependency between a program to be deployed in the node in a cluster and other programs to be deployed in the cluster is obtained; in step S202, connection information and an IP address of a sub/pub server are obtained; in step S203, the sub/pub server is connected; in step S204, messages of other programs on which the program is dependent are subscribed to the sub/pub server; in step S205, the program is deployed in response to obtaining a subscribed message of other programs from the sub/pub server. In a preferred embodiment, the method further comprises step S206 (not shown in FIG. 2) where in response to the deployment of the program being completed and the sub/pub server requiring the node to publish a message of the program, the message of the program is published to the sub/pub server. However, since not all programs need to publish messages, this step is preferred. In addition, in the above method, the connection information comprises user name, password, and other required information for connecting to the sub/pub server; the published message of the program contains the program's execution status and dependency data for use by other programs dependent on the program.

The dependency between a program to be deployed in the node in a cluster and other programs to be deployed in the cluster may come from dependencies among programs to be deployed on various nodes in the cluster. In one embodiment, those skilled in the art may use editor edition to describe a dependency among programs to be deployed on various nodes in the cluster, and then use text or script language to record. In one concrete embodiment, a graphical user interface may be provided for a user, and then the user expresses a dependency among programs to be deployed on various nodes in the cluster by dragging, and the dependency among programs to be deployed on various nodes in the cluster as presented by the user via the graphical user interface is expressed by a graphical summary file or converted to text or script language or other specified forms. Also the dependency among programs to be deployed on various nodes in the cluster may be recorded by a database or described in any other form that is known to those skilled in the art; different description rules may be formulated for delivering.

Dependencies among programs to be deployed on various nodes in the cluster may be stored by using a node in the cluster. In one embodiment, the node for storing the dependencies among programs to be deployed on various nodes in the cluster is a node that does not need to install a program.

Since dependencies among programs to be deployed on various nodes in the cluster may be described in various manners, there are multiple embodiments of obtaining a dependency between a program to be deployed in the node in a cluster and other programs to be deployed in the cluster. Where the dependencies among programs to be deployed on various nodes in the cluster are described by a database, obtaining a dependency between a program to be deployed in the node in a cluster and other programs to be deployed in the cluster may directly use a database query. For example, when using a relational database, DB query may be used for obtaining a program having a dependency with a program to be installed in the node; where the dependencies among programs to be deployed on various nodes in the cluster are described by text or script, the obtaining may be conducted by parsing the text or script; where the dependencies among programs to be deployed on various nodes in the cluster are described by a graphical summary file, the obtaining may be conducted by developing an application interface.

Figure 3:
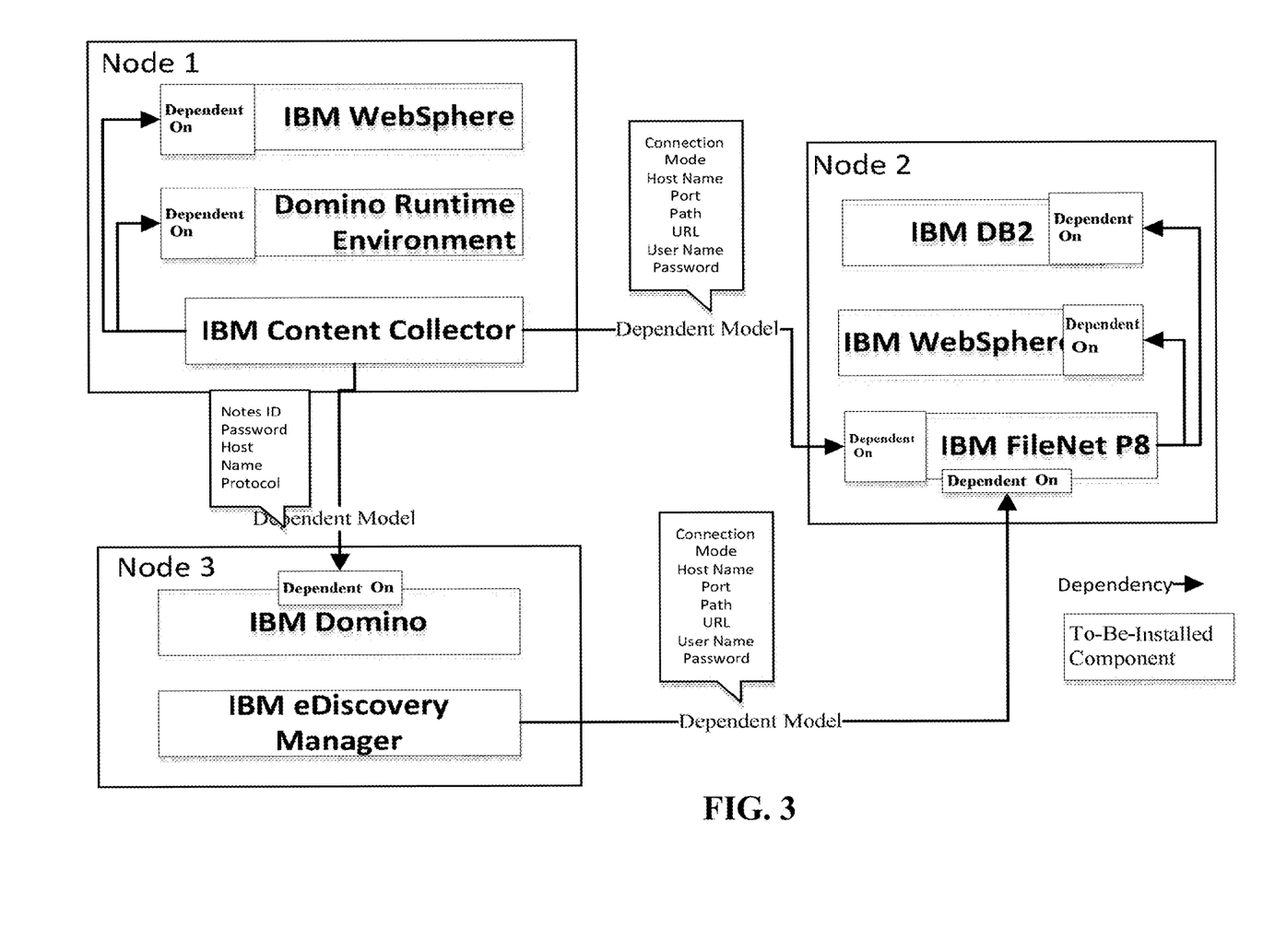
FIG. 3 describes one example of a circumstance where programs having a mutual dependency are deployed in three nodes in a cluster environment.

FIG. 3 describes one example of the circumstance where programs having a dependency are deployed on three nodes in a cluster environment. In FIG. 3, "IBM WebSphere", "IBM Domino Runtime Environment" and "IBM Content Collector" need to be installed and deployed in Node 1; "IBM DB2", "IBM WebSphere" and "IBM FileNet P8" need to be installed and deployed in Node 2; "IBM Domino" and "IBM eDiscovery Manager" need to be installed and deployed in Node 3. Dependencies among programs comprise a dependency among programs deployed in a node and a dependency among programs deployed on other nodes in a cluster. For example, "IBM Content Collector" in Node 1 is dependent on "IBM FileNet P8" in Node 2, "IBM Domino" in Node 3, as well as "IBM WebSphere" and "IBM Domino Runtime Environment" inside Node 1. "IBM eDiscovery Manager" in Node 3 is dependent on "IBM FileNet P8" in Node 2. Dependencies require not only the deployment of depended programs to be completed but also corresponding dependent parameters to be provided, such that the depended programs are enabled to be open to dependents. For example, regarding "IBM FileNet P8" in Node 2, dependent parameters to be open comprise "connection type", "host name", "port", "access path", "administrator name" and "administrator password". Regarding "IBM Domino" in Node 3, dependent parameters to be open comprise "Notes ID file path", "Notes user password", "Domino host name" and "connection protocol". Take the program IBM Content Collector in Node 1 as an example. A corresponding dependency may be represented by an XML file as below.

```
<?xml version="1.0" encoding="utf-8" ?>
    - <FeatureList>
        - <Feature>
            <Name>IBM Content Collector</Name>
            <Location>Node1</Location>
            <Version>4.0.0.0</Version>
          - <DependentFeatureList>
              - <DependentFeature>
                  <Name>IBM FileNet P8</Name>
                  <Location></Location>
                  <Availability>No</Availability>
                  <DependentParameters>
                  </DependentParameters>
              </DependentFeature>
              - <DependentFeature>
                  <Name>IBM Domino</Name>
                  <Location> </Location>
                  < Availability >No</ Availability >
                  <DependentParameters>
                  </DependentParameters>
              </DependentFeature>
              - <DependentFeature>
                  <Name>IBM Domino Runtime</Name>
                  <Location> </Location>
                  <Availability>No</Availability>
                  <DepedentParameter />
                  </DependentParameters>
              </DependentFeature>
              - <DependentFeature>
                  <Name>IBM WebSphere</Name>
                  <Location> </Location>
                  < Availability>No </ Availability >
                  <DependentParameters />
                  </DependentParameters>
              </DependentFeature>
          </DependentFeatureList>
    </Feature>
```

As is clear from the dependencies described by the above XML file, "IBM Content Collector" in Node 1 is dependent on "IBM FileNet P8", "IBM Domino", "IBM WebSphere" and "IBM Domino Runtime Environment". At this point, however, Node 1 does not know on which node these depended programs will be installed (the location field is null), whether the installation has been completed (the Availability field is null), and which parameters are needed (the DependentParameters field is null).

In one embodiment, each node stores dependencies among programs to be deployed on various nodes in the cluster, and then the node splits a dependency between a program to be deployed on this node and other programs to be deployed in the cluster from the dependencies among programs to be deployed on various nodes in the cluster. In another embodiment, dependencies among programs to be deployed on various nodes in the cluster may be split outside the node, and only a dependency between a program to be deployed on this node and other programs to be deployed in the cluster is stored in the node. For example, regarding Node 1 in the above example, only an XML fragment describing a dependency among three programs "IBM WebSphere", "IBM Domino Runtime Environment" and "IBM Content Collector" is retained.

The dependency between a program to be deployed in the node in a cluster and other programs to be deployed in the cluster may also be directly inputted to the node by a system administrator in a same manner as using the dependency among programs to be deployed on various nodes in the cluster, e.g., directly editing a text or script file, or using command-line input, using specific data structure storage, etc. Then, the obtained dependency between a program to be deployed in the node in a cluster and other programs to be deployed in the cluster is directly stored in the node.

In steps S203 and S204, a sub/pub system is prepared in the node. The sub/pub system subscribes to and publishes dependency information to a sub/pub server. In one embodiment, an IP address and connection mode of the sub/pub server may also be inputted by the system administrator during configuration or obtained via a program interface. And even the IP address and connection mode of the sub/pub server may be given in a file describing dependencies. For IP addresses and connection modes of different sub/pub servers, they may be obtained in different manners, e.g., via a program interface, by reading a file, by command-line parsing, etc.

Figure 4:
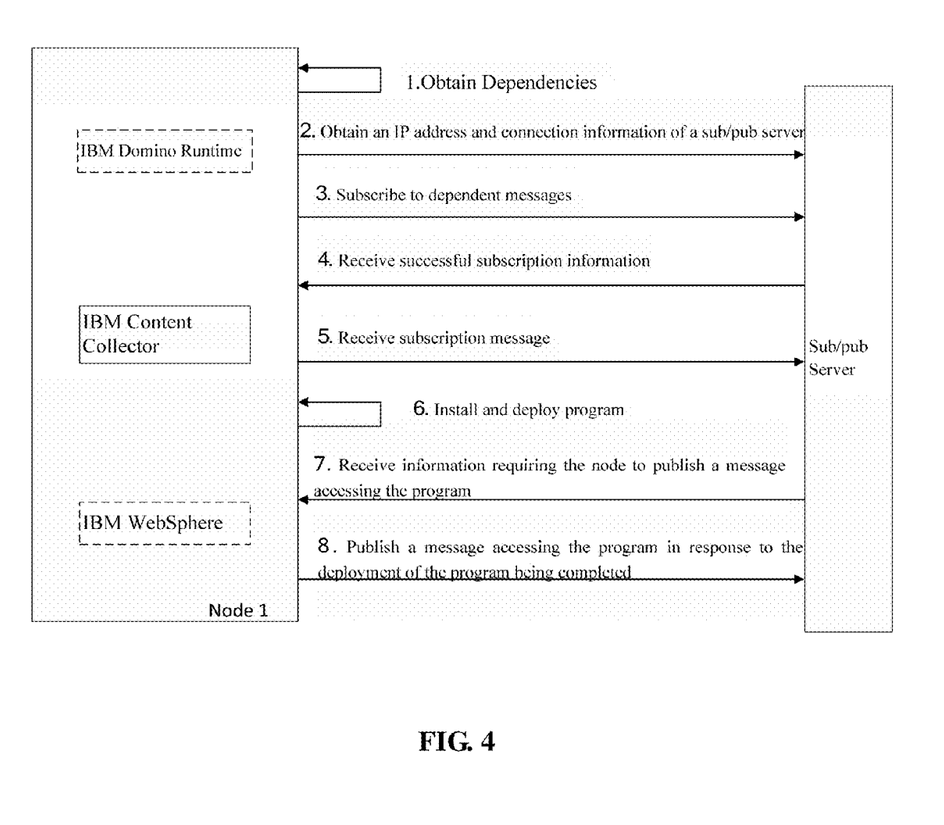
FIG. 4 shows a communication flow with a sub/pub server when node 1 in FIG. 3 is deploying "IBM Content Collector"

FIG. 4 shows a communication flow between Node 1 in FIG. 3 and the sub/pub server while deploying "IBM Content Collector".

Step 1: Node 1 obtains from a dependency repository a dependency between a program, i.e., "IBM Content Collector" to be deployed on this node in a cluster and other programs to be deployed in the cluster. For Node 1, a dependency of "IBM Content Collector" with "IBM WebSphere," "IBM Domino Runtime Environment" and "IBM Content Collector", i.e., the above XML file may be obtained.

Step 2: Node 1 obtains an IP address and connection information of the sub/pub server, which may be configured by the system administrator or saved in a storage device and obtained by accessing the device; or stored in a network and obtained via an interface, etc.

Step 3: Node 1 uses the IP address and connection information of the sub/pub server to connect to the sub/pub server and subscribe to the sub/pub server for information of other programs being depended on. While connecting to the sub/pub server, the node further needs to report to the sub/pub server all programs to be installed in the node.

In one embodiment of connecting to the sub/pub server and subscribing to the sub/pub server for messages of other programs being depended on, internal dependency and external dependency may be differentiated. For example, regarding Node 1, "IBM FileNet P8" and "IBM Domino" are external dependencies, while "IBM WebSphere" and "IBM Domino Runtime Environment" are internal dependencies. Then the step further comprises: in response to other programs to be deployed in the cluster comprising a program to be deployed inside the node and a program to be deployed on other nodes in the cluster, connecting to the sub/pub server and only subscribing to the sub/pub server for a message of the depended program to be deployed on other nodes in the cluster. Relevant information on a program to be deployed inside the node may be obtained through internal communications. That is, the method further comprises: further, in response to other programs to be deployed in the cluster comprising a program to be deployed inside the node, obtaining a message of the program to be deployed inside the node through intra-node communications. In another embodiment, internal dependency and external dependency are not differentiated; that is, all dependencies are regarded as external dependencies, and even a program to be deployed inside the node is also regarded as a program to be deployed on other nodes in the cluster and should be subscribed to via the sub/pub server. Similarly, there exists internal release and external release for releasing. An external release is a normal release. In parsing dependencies among programs inside the node, if an internal dependency is discovered, then in response to the dependency indicating that other programs to be deployed in the node are dependent on the program, a message of the program is published by intra-node communications. Of course, all dependencies may also be regarded as external dependencies, and all messages of programs to be deployed in the node are published to the sub/pub server, without any release process inside the node.

Step 4: Node 1 receives successful subscription information from the sub/pub server.

For example, after the sub/pub server receives a message indicating that Node 1 needs to install and deploy "IBM WebSphere", "IBM Domino Runtime Environment" and "IBM Content Collector", and receives a subscription message indicating that "IBM Content Collector" subscribes to "IBM FileNet P8" and "IBM Domino", the sub/pub server sends successful subscription information.

Step 5: Node 1 receives a subscription message from the sub/pub server.

After subscription, the sub/pub server discovers Node 2 needs to install and deploy "IBM DB2", "IBM WebSphere" and "IBM FileNet P8," and Node 3 needs to install and deploy "IBM Domino" and "IBM eDiscovery Manager", then in response to receiving a message of accessing "IBM FileNet P8" published by Node 2 (i.e., Node 2 completes the deployment of "IBM FileNet P8"), the sub/pub server sends the message to Node 1 according to the subscription message, and in response to receiving an accessing "IBM Domino" message published by Node 3 (i.e., Node 3 completes the deployment of "IBM Domino"), the sub/pub server sends the message to Node 1 according to the subscription message; and Node 1 obtains parameters and installation and deployment of "IBM WebSphere" and "IBM Domino Runtime Environment" via an internal program. In the messages published by Nodes 2 and 3, corresponding dependent parameters are further comprised besides the program-completion deployment, such that the program can be open to dependents. For example, in "IBM FileNet P8" in Node 2, dependent parameters to be open comprise "connection type", "host name", "port", "access path", "administrator name" and "administrator password". In "IBM Domino" in Node 3, dependent parameters to be open comprise "Notes ID file path", "Notes user password", "Domino host name" and connection protocol.

In another embodiment, Node 1 does not differentiate subscription information of external and internal dependencies, and processes subscription information of external and internal dependencies likewise, whereby the same effect as the above embodiment is achieved. With respect to the sub/pub server, subscription information of external and internal dependencies is not differentiated.

After Node 1 obtains the subscription message from the sub/pub server, an XML file of its dependency is updated as:

```
<?xml version="1.0" encoding="utf-8" ?>
- <FeatureList>
    - <Feature>
        <Name>IBM Content Collector</Name>
        <Location>Node1</Location>
        <Version>4.0.0.0</Version>
        - <DependentFeatureList>
            - <DependentFeature>
                <Name>IBM FileNet P8</Name>
                <Location>Node2</Location>
                <Availability>Yes</Availability>
                <DependentParameters>ConnectionType="http",
                    HostName="Node2", Port=9080, Path="wsi/FNCEWS40MTOM",
                    AdminID="ceadmin",
                    Password="password"</DependentParameters>
            </DependentFeature>
            - <DependentFeature>
                <Name>IBM Domino</Name>
                <Location>Node3</Location>
                <Availability >Yes</Availability >
                <DependentParameters>NotesIDLocation="\\Node3\Share\ICCAdmin.id",
                    Password="password", HostName="Node3",
                    Protocol="IPV4"</DependentParameters>
            </DependentFeature>
            - <DependentFeature>
                <Name>IBM Domino Runtime</Name>
                <Location>Node1</Location>
                <Availability>Yes</Availability>
                <DepentParameter />
            </DependentFeature>
            - <DependentFeature>
                <Name>IBM WebSphere</Name>
                <Location>Node1</Location>
                <Availability >Yes</Availability >
                <DependentParameters />
            </DependentFeature>
        </DependentFeatureList>
    </Feature>
```

Step 6: Node 1 installs and deploys "IBM Content Collector". Since "IBM WebSphere" and "IBM Domino" in Node 1 are not dependent on other programs, they are deployed rapidly. Moreover, "IBM Content Collector" is notified of relevant access information by an internal program or the sub/pub server. During the notification by an internal program, various approaches may be used such as a program interface, messaging, etc. When installing "IBM Content Collector", the updated dependency is used for connecting to Nodes 2 and 3, whereby direct deployment is enabled.

Step 7: information indicating that the sub/pub server requires the node to publish a message accessing the program is received.

Step 8: in response to the program deployment being completed, a message of the program is published to the sub/pub server, wherein the published message of the program contains dependent data and execution status of the program for use by other programs dependent on the program.

Since in this example there exists no program dependent on "IBM Content Collector" in the cluster, the sub/pub server will not require the node to publish a message accessing the program. In fact, for this example, steps 7 and 8 do not exist. That is, step S205 may be decomposed into steps 7 and 8.

Figure 5:
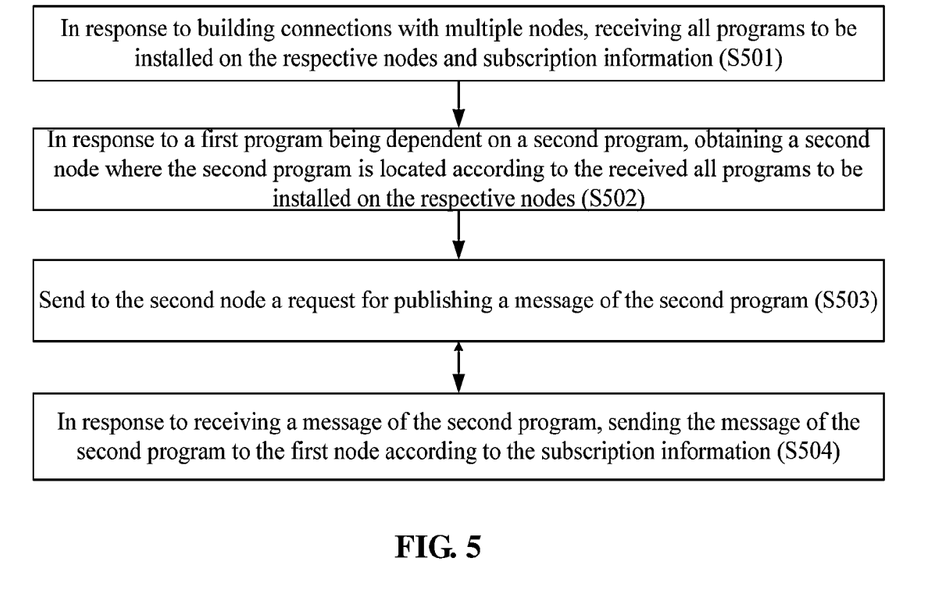
FIG. 5 shows a workflow of a method for coordinating program deployment in a cluster node.

FIG. 4 further describes a workflow of the sub/pub server from another perspective. FIG. 5 shows a workflow of a method for coordinating program deployment in a cluster node, i.e., a workflow for the sub/pub server. In one embodiment, the sub/pub server only receives sub/pub information of external dependencies, or does not differentiate external and internal dependencies but performs a uniform processing. According to FIG. 5, in step S501, in response to building connections with multiple nodes, subscription information and all programs to be deployed on respective nodes are received; in step S502, in response to subscription information of a first node indicating that a first program to be deployed thereon is dependent on a second program, a second node where the second program is located is obtained according to the received all programs to be deployed on respective nodes; in step S503, a request for publishing a message of the second program is sent to the second node; in step S504, in response to receiving the message of the second program from the second node, the message of the second program is sent to the first node according to the subscription information. In one embodiment, in response to sending the published message of the second program to the first node, a connection fault occurs in the first node, so the message of the second program is saved until the message is sent to the first node. Thus, it is ensured that messages subscribed to will not be lost and a result will be received.

The various embodiments implementing the method of the present invention have been described above with reference to the accompanying drawings. Those skilled in the art may understand that the method may be implemented in software, hardware or a combination of software and hardware. Moreover, those skilled in the art may understand by implementing various steps in the above method in software, hardware or a combination of software and hardware, there may be provided, based on the same inventive concept, a system for deploying programs in a cluster node and a system for coordinating program deployment in a cluster node. Even though these systems have the same hardware structure as a general-purpose processing device, the functionality of software contained therein makes these systems manifest distinguishing properties from the general-purpose processing device, thereby forming an apparatus of the various embodiments of the present invention. The apparatus described in the present invention comprises several units or modules, the units or modules configured to execute corresponding steps. Upon reading this specification, those skilled in the art may understand how to write a program for implementing actions performed by the units or modules. Since the systems are based on the same inventive concept as the method, the same or corresponding implementation details are also applicable to an apparatus corresponding to the method. As detailed and complete description has been presented above, the apparatus is not detailed below.

Figure 6:
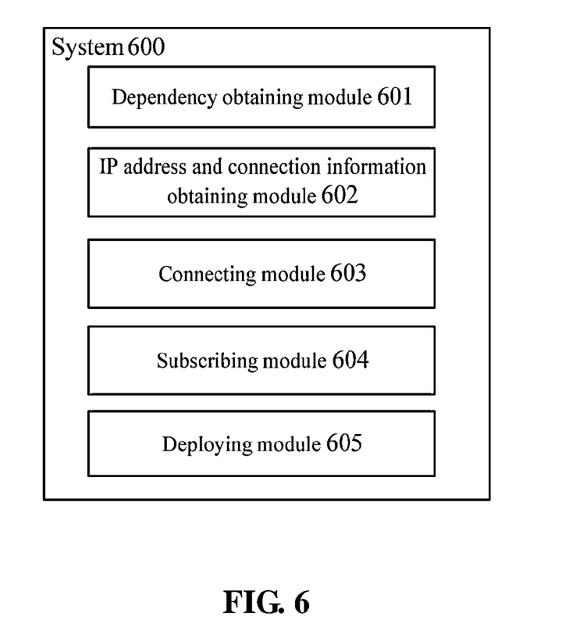
FIG. 6 shows a structure block diagram of a system 600 for deploying programs in a cluster node.

Under the same inventive concept, the embodiments of the present invention further disclose a system for deploying programs in a cluster node. FIG. 6 shows a structure block diagram of a system 600 for deploying programs in a cluster node. According to FIG. 6, the system comprises: a dependency obtaining module 601 configured to obtain a dependency between a program to be deployed in the node in the cluster and other programs to be deployed in the cluster; an IP address and connection information obtaining module 602 configured to obtain an IP address and connection information of a sub/pub server; a connecting module 603 configured to connect to the sub/pub server; a subscribing module 604 configured to subscribe to the sub/pub server for a message of other programs being depended on; and a deploying module 605 configured to deploy the program in response to obtaining the subscribed message of other programs from the sub/pub server.

In one embodiment, the system shown in FIG. 6 further comprises (not shown in FIG. 6): a publishing module configured to publish a message of the program to the sub/pub server in response to the deployment of the program being completed and the sub/pub server requiring the node to publish a message of the program.

In another embodiment, the subscribing module further comprises: a reporting module configured to report to the sub/pub server all programs to be installed in the node.

In one embodiment, the subscribing module is further configured to: in response to other programs to be deployed in the cluster including a program to be deployed inside the node and a program to be deployed in other nodes in the cluster, only subscribing to the sub/pub server for a message of a depended program to be deployed in other nodes in the cluster.

In one embodiment, the system shown in FIG. 6 further comprises (not shown in FIG. 6): an intra-node communicating module configured to, in response to other programs to be deployed in the cluster including a program to be deployed inside the node, obtain a message of the program to be deployed inside the node through intra-node communications. In another embodiment, the intra-node communicating module is further configured to: in response to the dependency indicating that other programs to be deployed in the node are dependent on the program, publish a message of the program by intra-node communications.

Figure 7:
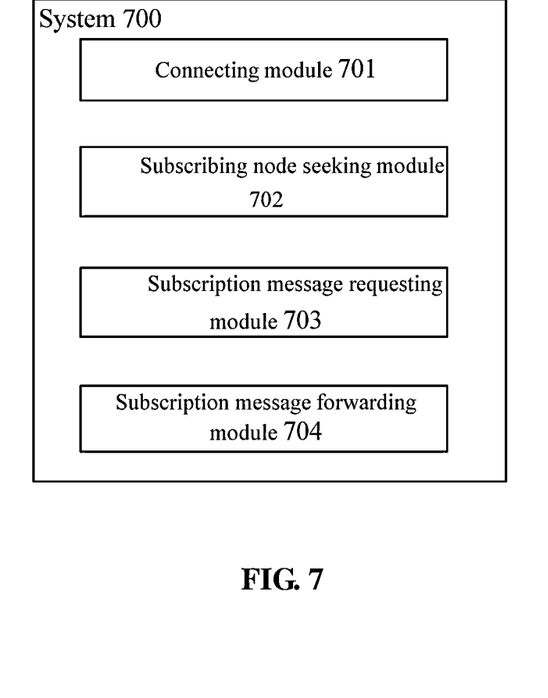
FIG. 7 shows a structure block diagram of a system 700 for coordinating program deployment in a cluster node.

Under the same inventive concept, the embodiments of the present invention further disclose a system for coordinating program deployment in a cluster node. FIG. 7 shows a structure block diagram of a system 700 for coordinating program deployment in a cluster node. According to FIG. 7, the system comprises: a connecting module 701 configured to, in response to building connections with multiple nodes, receive all programs to be installed in the respective nodes and subscription information; a subscribing node seeking module 702 configured to, subscription information of a first node indicating that a first program to be deployed is dependent on a second program, obtain a second node where the second program is located according to the received all programs to be installed in the respective nodes; a subscription message requesting module 703 configured to send to the second node a request for publishing a message of the second program; and a subscription message forwarding module 704 configured to, in response to receiving a message of the second program from the second node, send the message of the second program to the first node according to the subscription information.

In one embodiment, the subscription message forwarding module comprises: a fault handling module configured to, in response to a connection fault occurring in the first node when sending the published message of the second program to the first node, save the message of the second program until the message is sent to the first node.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to one aspect of the present invention, there is provided a method for deploying programs in a cluster node, comprising: obtaining a dependency between a program to be deployed in the node in the cluster and other programs to be deployed in the cluster; obtaining an IP address and connection information of a sub/pub server; connecting to the sub/pub server; subscribing to the sub/pub server for a message of other programs on which the program is dependent; and deploying the program in response to obtaining the subscribed message of other programs from the sub/pub server.

According to another aspect of the present invention, there is provided a method for coordinating program deployment in a cluster node, comprising: in response to building connections with multiple nodes, receiving all programs to be installed on the respective nodes and subscription information; in response to subscription information of a first node indicating that a first program to be deployed in the first node is dependent on a second program, obtaining a second node where the second program is located according to the received all programs to be installed on the respective nodes; sending to the second node a request for publishing a message of the second program; and in response to receiving a message of the second program from the second node, sending the message of the second program to the first node according to the subscription information.

According to a further aspect of the present invention, there is provided a system for deploying programs in a cluster node, comprising: a dependency obtaining module configured to obtain a dependency between a program to be deployed in the node in the cluster and other programs to be deployed in the cluster; an IP address and connection information obtaining module configured to obtain an IP address and connection information of a sub/pub server; a connecting module configured to connect to the sub/pub server; a subscribing module configured to subscribe to the sub/pub server for a message of other programs on which the program is dependent; and a deploying module configured to deploy the program in response to obtaining the subscribed message of other programs from the sub/pub server.

According to a still further aspect of the present invention, there is provided a system for coordinating program deployment in a cluster node, comprising: a connecting module configured to, in response to building connections with multiple nodes, receive all programs to be installed on the respective nodes and subscription information; a subscribing node seeking module configured to, in response to subscription information of a first node indicating that a first program to be deployed in the first node is dependent on a second program, obtain a second node where the second program is located according to the received all programs to be installed on the respective nodes; a subscription message requesting module configured to send to the second node a request for publishing a message of the second program; and a subscription message forwarding module configured to, in response to receiving a message of the second program from the second node, send the message of the second program to the first node according to the subscription information.

By means of the methods and systems according to the above aspects of the present invention, it is possible to deploy programs in a cluster rapidly and easily, thereby saving work of program developers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deploying programs in a cluster node, the computer-implemented method comprising:
   obtaining, by one or more processors, a dependency between a program to be deployed in a node in a cluster and other programs to be deployed in the cluster;
   obtaining, by one or more processors, an IP address and connection information of a sub/pub server, wherein the sub/pub server is a server that provides subscription and publication services;
   connecting, by one or more processors, a client computer to the sub/pub server;

subscribing, by one or more processors, to the sub/pub server for a message of other programs on which the program is dependent;

deploying, by one or more processors, the program in response to obtaining the subscribed message of other programs on which the program is dependent from the sub/pub server;

in response to building connections with multiple nodes, receiving, by one or more processors, all programs to be installed on respective nodes and subscription information;

in response to subscription information of a first node indicating that a first program to be deployed in the first node is dependent on a second program, obtaining, by one or more processors, a second node where the second program is located according to the received all programs to be installed on respective nodes;

sending, by one or more processors, to the second node a request for publishing a message of the second program; and in response to receiving a message of the second program from the second node, sending, by one or more processors, the message of the second program to the first node according to the subscription information.

2. The computer-implemented method according to claim 1, further comprising:

publishing, by one or more processors, a notification of the program to the sub/pub server in response to deployment of the program being completed and in response to the sub/pub server requiring the node to publish the notification of the program.

3. The computer-implemented method according to claim 1, wherein said connecting the client computer to the sub/pub server comprises:

reporting, by one or more processors, to the sub/pub server all programs to be installed in the node.

4. The computer-implemented method according to claim 1, wherein the subscribing to the sub/pub server for the message of other programs on which the program is dependent comprises:

in response to other programs being deployed in the cluster including a program to be deployed inside the node and in response to the program being deployed in other nodes in the cluster, only subscribing to the sub/pub server for a message of a depended program to be deployed in other nodes in the cluster.

5. The computer-implemented method according to claim 4, further comprising:

in response to other programs to be deployed in the cluster including a particular program to be deployed inside the node, obtaining, by one or more processors, a message describing a program to be deployed inside the node through intra-node communications.

6. The computer-implemented method according to claim 5, further comprising:

in response to a dependency indicating that other programs to be deployed in the node are dependent on the particular program, publishing, by one or more processors, a message of the particular program by intra-node communications.

7. The computer-implemented method according to claim 1, wherein the sending the message of the second program to the first node according to the subscription information comprises:

in response to a connection fault occurring in the first node when sending the published message of the second program to the first node, saving, by one or more processors, the message of the second program until the message is sent to the first node.

8. A computer program product for deploying programs in a cluster node, the computer program product comprising a computer readable storage medium having program code embodied therewith, wherein the computer readable storage medium is not a transitory signal per se, and wherein the program code is readable and executable by a processor to perform a method comprising:

obtaining a dependency between a program to be deployed in a node in a cluster and other programs to be deployed in the cluster;

obtaining an IP address and connection information of a sub/pub server, wherein the sub/pub server is server that provides a subscription and publication service;

connecting a client computer to the sub/pub server;

subscribing to the sub/pub server for a message of other programs on which the program is dependent;

deploying the program in response to obtaining the subscribed message of other programs on which the program is dependent from the sub/pub server;

in response to building connections with multiple nodes, receiving all programs to be installed on respective nodes and subscription information;

in response to subscription information of a first node indicating that a first program to be deployed in the first node is dependent on a second program, obtaining a second node where the second program is located according to the received all programs to be installed on respective nodes;

sending to the second node a request for publishing a message of the second program; and in response to receiving a message of the second program from the second node, sending the message of the second program to the first node according to the subscription information.

9. The computer program product of claim 8, wherein the method further comprises:

publishing a notification of the program to the sub/pub server in response to deployment of the program being completed and in response to the sub/pub server requiring the node to publish the notification of the program.

10. The computer program product of claim 8, wherein the method further comprises:

reporting to the sub/pub server all programs to be installed in the node.

11. The computer program product of claim 8, wherein the method further comprises:

in response to other programs being deployed in the cluster including a program to be deployed inside the node and in response to the program being deployed in other nodes in the cluster, only subscribing to the sub/pub server for a message of a depended program to be deployed in other nodes in the cluster.

12. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to obtain a dependency between a program to be deployed in a node in a cluster and other programs to be deployed in the cluster;

program instructions to obtain an IP address and connection information of a sub/pub server, wherein the sub/pub server is a server that provides subscription and publication services;
program instructions to connect a client computer to the sub/pub server;
program instructions to subscribe to the sub/pub server for a message of other programs on which the program is dependent;
program instructions to deploy the program in response to obtaining the subscribed message of other programs on which the program is dependent from the sub/pub server;
program instructions to, in response to building connections with multiple nodes, receive all programs to be installed on respective nodes and subscription information;
program instructions to, in response to subscription information of a first node indicating that a first program to be deployed in the first node is dependent on a second program, obtain a second node where the second program is located according to the received all programs to be installed on respective nodes;
program instructions to send to the second node a request for publishing a message of the second program; and
program instructions to, in response to receiving a message of the second program from the second node, send the message of the second program to the first node according to the subscription information.

13. The computer system of claim 12, further comprising:
program instructions to publish a notification of the program to the sub/pub server in response to deployment of the program being completed and in response to the sub/pub server requiring the node to publish the notification of the program.

14. The computer system of claim 12, further comprising:
program instructions to report to the sub/pub server all programs to be installed in the node.

15. The computer system of claim 12, further comprising:
program instructions to, in response to other programs being deployed in the cluster including a program to be deployed inside the node and in response to the program being deployed in other nodes in the cluster, only subscribe to the sub/pub server for a message of a depended program to be deployed in other nodes in the cluster.

16. The computer system of claim 12, further comprising:
program instructions to, in response to other programs to be deployed in the cluster including a particular program to be deployed inside the node, obtain a message describing a program to be deployed inside the node through intra-node communications.

17. The computer system of claim 16, further comprising:
program instructions to, in response to a dependency indicating that other programs to be deployed in the node are dependent on the particular program, publish a message of the particular program by intra-node communications.

18. The computer system of claim 12, further comprising:
program instructions to, in response to a connection fault occurring in the first node when sending the published message of the second program to the first node, save the message of the second program until the message is sent to the first node.

* * * * *